United States Patent
Pietromonaco (10) Patent No.: US 10,298,101 B2
(45) Date of Patent: May 21, 2019

(54) DRIVER CIRCUIT FOR ELECTRIC MOTORS

(71) Applicant: ARM Ltd., Cambridge (GB)

(72) Inventor: David Victor Pietromonaco, Cupertino, CA (US)

(73) Assignee: ARM Ltd., Cambridge (GB)

( * ) Notice: Subject to any disclaimer, the term of this patent is extended or adjusted under 35 U.S.C. 154(b) by 284 days.

(21) Appl. No.: 15/145,702

(22) Filed: May 3, 2016

(65) Prior Publication Data

US 2017/0324308 A1    Nov. 9, 2017

(51) Int. Cl.
| | |
|---|---|
| *H02K 11/33* | (2016.01) |
| *H02P 25/16* | (2006.01) |
| *H02K 11/20* | (2016.01) |
| *H02K 1/14* | (2006.01) |
| *H02K 3/28* | (2006.01) |
| *H02P 25/092* | (2016.01) |
| *H02K 3/12* | (2006.01) |
| *H02K 19/10* | (2006.01) |

(52) U.S. Cl.
CPC .............. *H02K 11/33* (2016.01); *H02K 1/14* (2013.01); *H02K 3/28* (2013.01); *H02K 11/20* (2016.01); *H02P 25/092* (2016.02); *H02P 25/16* (2013.01); *H02K 19/103* (2013.01)

(58) Field of Classification Search
CPC . H02K 1/14; H02K 3/28; H02K 11/20; H02K 11/33
See application file for complete search history.

(56) References Cited

U.S. PATENT DOCUMENTS

| | | | | |
|---|---|---|---|---|
| 3,678,436 A | * | 7/1972 | Herdrich | H01F 13/003 310/156.79 |
| 3,825,782 A | * | 7/1974 | Dassler | H02K 19/24 310/168 |
| 4,085,692 A | * | 4/1978 | Soeda | D05B 69/20 112/275 |
| 5,132,603 A | * | 7/1992 | Yoshimoto | H02K 37/14 310/257 |
| 6,037,740 A | | 3/2000 | Pollock et al. | |
| 6,788,020 B1 | * | 9/2004 | Pollock | H02P 1/16 318/599 |
| 8,450,954 B2 | | 5/2013 | Pietromonaco | |

(Continued)

OTHER PUBLICATIONS

Notification of Transmittal of the International Search Report and the Written Opinion of the International Searching Authority, or the Declaration, International Application No. PCT/GB2017/051230, dated Aug. 4, 2017. 1 pg.

(Continued)

*Primary Examiner* — Bentsu Ro
(74) *Attorney, Agent, or Firm* — Berkeley Law & Technology Group, LLP (57) ABSTRACT

A method and a device for engendering rotation of a rotor relative to a stator. Stator teeth may comprise a mutually coupled coil winding pair, and a driver circuit may drive current through a first coil winding of the mutually coupled coil winding pair to generate a current on a second coil winding of the mutually coupled coil winding pair. The driver circuit may drive charge through the second coil winding to apply a torque to a rotor tooth. The driver circuit may also recapture and store charge to drive through the second coil winding.

27 Claims, 7 Drawing Sheets

(56) References Cited

U.S. PATENT DOCUMENTS

| | | |
|---|---|---|
| 9,130,433 B2 | 9/2015 | Pietromonaco |
| 9,214,837 B2 | 12/2015 | Pietromonaco |
| 2005/0189927 A1 | 9/2005 | Myers |
| 2015/0326100 A1 | 11/2015 | Pietromonaco |
| 2016/0065041 A1 | 3/2016 | Pietromonaco |
| 2016/0079889 A1 | 3/2016 | Pietromonaco |
| 2016/0079893 A1 | 3/2016 | Pietromonaco |

OTHER PUBLICATIONS

International Search Report, International Application No. PCT/GB2017/051230, dated Aug. 4, 2017, 4 pgs.
Written Opinion of The International Searching Authority, International Application No. PCT/GB2017/051230, dated Aug. 4, 2017, 7 pgs.
Notification Concerning Transmittal of Copy of International Preliminary Report on Patentability (Chapter 1 of the Patent Cooperation Treaty, International Application No.: PCT/GB2017/051230, dated Nov. 15, 2018, 1 pg.
International Preliminary Report on Patentability, International Application No. PCT/GB2017/051230, dated Nov. 15, 2018, 1 pg.

* cited by examiner

DRIVER CIRCUIT FOR ELECTRIC MOTORS

FIELD

The subject matter disclosed herein relates generally to electric motors and/or driver circuits for electric motors.

BACKGROUND

There are several different ways of configuring electric motors and/or driver circuits each of which has its own associated advantages and disadvantages. Some configurations may provide efficient operation. However, efficient operation is generally drawn to particular operating frequency of a motor and as the motor moves away from this operating frequency the efficiency may drop dramatically. To address this, previous motors have used, by way of example, gearing systems to enable driving axles at different speeds, while still operating close to desired rotation frequency. Adding gears or other mechanical drive mechanisms to an electric motor adds cost and can also reduce efficiency.

It may be desirable to increase the range of efficient operation of an electric motor.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

Reference is made in the following detailed description to accompanying drawings, which form a part hereof, wherein like numerals may designate like parts throughout are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

In some electric motors, efficiency of the motor, which refers to a ratio of shaft output power to electrical input power, varies at different rotor speeds. In fact, in some electric motors, peak efficiency may occur within narrow power bands. By way of non-limiting example, some electric motors may be efficient at high voltages but relatively inefficient at lower voltages (or power signal frequencies, in the case of AC motors). For instance, low voltages at coil windings of an electric motor may induce weaker electromagnetic field on the coil windings, which may result in a lower output power for engendering rotation of a rotor of the electric motor. A number of approaches to overcoming inefficient low voltage/frequency operation are currently used. For example, one approach may be to use a multi-phase power supply. While some electric motors may comprise more than three phases, the cost of the phase driver electronics may be disadvantageous (e.g., adding to the cost of the driver circuitry). As should be apparent, motors enabled to operate over multiple phases may call for multiple coil driver circuits that may also be expensive to produce according to contemporary techniques.

Another approach to overcoming low voltage inefficiency is to use mechanical components to overcome electrical and/or magnetic inefficiencies. For instance, mechanical gearboxes and/or transmission systems (e.g., even using multiple motors) may be used to maintain efficiency across a wider range of output levels at the cost of mechanical complexity and increasingly expensive electric motors.

Furthermore, in some cases, low voltage operation may be mandated, such as for safety. For example, small battery operation (e.g., drones, handheld vacuums, electric toothbrushes, etc.) and vehicular uses (e.g., for blowers, electric windows, seats, etc. in cars, buses, trains, planes, etc. regulations may constrain voltage to 12.0V), among others, may mean a choice between electric motors with complex and expensive drivers, gearboxes, transmissions, etc. or operating an electric motor inefficiently.

Figure 2A:
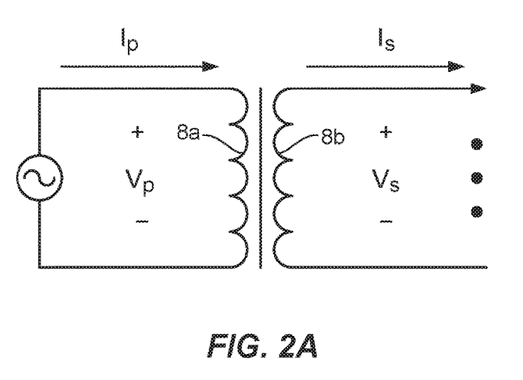
FIG. 2A is a schematic diagram of an example transformer according to an embodiment.

Therefore, there may be a desire for a relatively inexpensive and/or simple way of operating electric motors at low voltages. One approach may comprise transforming a low voltage, such as from a battery, to a higher voltage to drive an electric motor. FIG. 2A illustrates a simple transformer comprising a mutually inductive coil winding pair. As shown, an oscillator (e.g., an AC power source) may drive a current $I_p$ through a primary coil winding 8a. Of course, transformers operate consistently with the law of conservation of energy and Faraday's law of induction, such that a power on first mutually coupled coil winding 8a is equal to a power on second coil winding 8b of the mutually coupled inductive pair, represented as $P=I_pV_p=I_sV_s$. According to Faraday's law, there is a relationship between the number of turns of the coil winding and the induced voltage. As such, it may be possible to induce a desired voltage and/or current on second coil winding 8b by selecting an appropriate coil, such as with an appropriate number of turns. For example, Faraday's law of induction provides that a voltage for a wound coil may be represented as $$V = -N\frac{d\Phi}{dt},$$

where N refers to a number of turns of a coil winding and dΦ refers to a change in magnetic flux. In other words, a voltage on a coil winding may be proportional to a change in magnetic flux. Additionally, Lenz's law provides that changes in current on one coil winding of a mutually coupled coil winding pair, may be opposed by current induced on the other coil winding of the pair. Thus, changes in $I_p$ in primary coil winding 8a may induce an electromagnetic field. In response, an opposing electromagnetic field may be induced on secondary coil winding 8b, which may generate a current $I_s$, which is opposite in direction to that of $I_p$. And because, as noted, if second coil winding 8b comprises more coil turns than primary coil winding 8a, a step-up effect may be created wherein a lower voltage $V_p$ may generate a greater voltage $V_s$ on the secondary coil winding 8b. Furthermore, it may be desirable to, rather than using a separate transformer, enable the coils of an electric motor to act as a step up transformer.

According to an embodiment, a change in a current through a coil winding on a stator tooth may induce a magnetic force, creating a torque to drive a motor. In a particular implementation, a stator tooth may comprise two coil windings, a first coil winding to receive a signal from a power supply and a second coil winding to generate the magnetic force creating the torque. It may be desirable to enable yet further efficiency in electric motor operation by capturing and/or reusing the current generated on the second coil winding. In one embodiment, this may be achieved by allowing stored charge to oscillate through the second coil winding. Responsive to changes in current through the second current from oscillation of the stored charge, the second coil winding may induce a magnetic force to create the torque. For instance, the second coil winding may be arranged relative one or more charge storage devices (e.g., capacitors) to form a resonance circuit capable of maintaining an oscillating current to induce an electromagnetic field. In a particular implementation, one or more switches may be used in a driver circuit to, among other things, facilitate control of timing of oscillations of current through the second coil winding. In particular implementations, the first and second coil windings on the stator tooth form a mutually inductive pair such that the first coil winding may, in response to a power signal, generate a magnetic field inducing a current in the second coil winding. The driver circuit may synchronize the induced current in the second coil winding and add it to current in the second coil winding from the oscillating charge.

Figure 1:
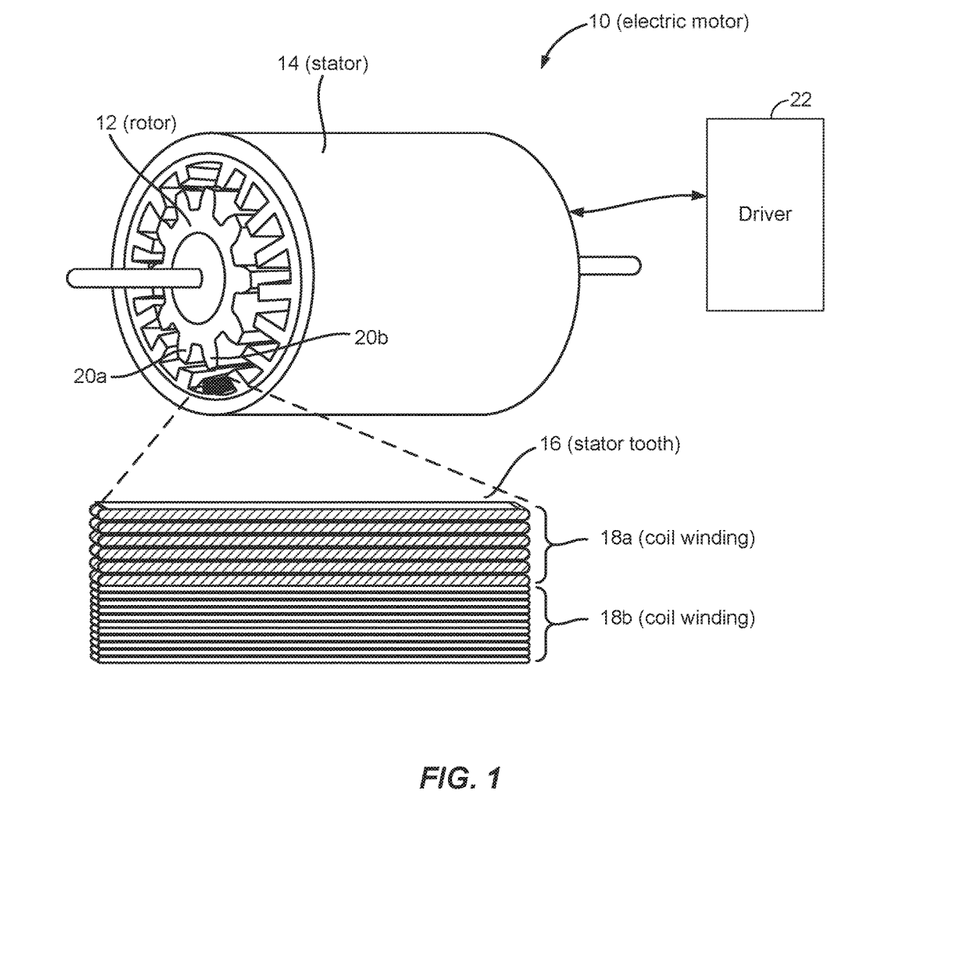
FIG. 1 is a block diagram illustrating a schematic electric motor and driver according to one embodiment.

According to an embodiment, an electric motor 10 in FIG. 1 may comprise a stator 14 and a rotor 12 capable of moving in relation to stator 14. Though not limited in this respect, stator 14 and/or rotor 12 of example electric motor 10 may comprise one or more raised portions, or teeth, such as stator tooth 16 and rotor teeth 20a and 20b. Rotor 12 may rotate relative to stator 14 responsive, at least in part, to one or more electromagnetic forces between one or more teeth of stator 14 and one or more teeth of rotor 12. For example, an electromagnetic force (e.g., an attractive or repulsive force) may be generated (e.g., such as in response to changes in current driven through a stator coil winding) between stator tooth 16 and one or more of rotor teeth 20a or 20b. In one embodiment, one or more electromagnetic forces may be generated based, at least in part, on an electromagnetic field formed between one or more stator teeth of an electric motor, such as stator tooth 16, and one or more rotor teeth of an electric motor, such as rotor teeth 20a and 20b. In FIG. 1, stator tooth 16 comprises a first coil winding 18a and a second coil winding 18b. A current may be driven through one or more of first or second coil windings 18a or 18b in order to induce an electromagnetic field (e.g., a change in current may yield an electromagnetic field). For simplicity, electromagnetic forces and electromagnetic fields are referred to herein interchangeably as EMF. Consequently, current (e.g., one or more current pulses) may be driven through the coil windings of a plurality of teeth of stator 14 in order to produce a plurality of electromagnetic forces relative to the teeth of rotor 12, such as shall be described hereinafter with reference to FIG. 3. In one embodiment, a driver 22 and/or control circuit (not shown, but may be combined in driver 22 or may be independent therefrom) may enable generation of electromagnetic forces consistent with a desired timing to produce movement of rotor 12 relative to stator 14. For simplicity of illustration, FIG. 1 only shows that a single stator tooth 16 comprises first and second coil windings 18a and 18b. It is to be understood, however, that multiple stator teeth of stator 14, if not all stator teeth of stator 14, may similarly include first and second coil windings (not shown) according to applicable description of first and second coil windings 18a and 18b provided herein. Furthermore, it is to be further understood that description of features of diver circuit 22 in relation to first and second coil windings 18a and 18b of stator tooth 16 may also apply to similar driver circuitry (not shown) to be used for controlling behavior of first and second coil windings on other teeth of stator 14. It is also to be understood that the arrangement of first coil winding 18a and second coil winding 18b on stator tooth 16 is arbitrarily illustrated in FIG. 1 with first coil winding 18a above second coil winding 18b. In one embodiment, second coil winding 18b may be closer to rotor teeth, such as rotor teeth 20a and 20b, than first coil winding 18a. Or, alternatively, first and second coil windings 18a and 18b may be partially or completely overlapping. Furthermore, different variations in wire sizes and/or turn ratios are contemplated by the present description. For example, in one implementation, first coil winding 18a may comprise coil of a thicker gauge than that of second soil 18b. In another embodiment, first coil winding 18a and second coil winding 18b may comprise wire of approximately a same gauge and/or second coil winding 18b may be wound to have double or triple the number of turns about stator tooth 14.

For instance, in one embodiment, first and second coil windings 18a and 18b may be arranged to operate similarly to the transformer embodiment of FIG. 2A. In one particular embodiment of stator tooth 16, second coil winding 18b may comprise a greater number of turns around stator tooth 16 than first coil winding 18a does. In one embodiment, first and second coil windings 18a and 18b may operate as primary and secondary coil windings of the transformer of FIG. 2A. It is noted that while transformers typically receive an AC signal, in some embodiments it may be possible to achieve a transformer-like effect using a DC power signal, as shall be discussed hereinafter, such as by using an appropriate driver, such as driver circuit 22.

Figure 2B:
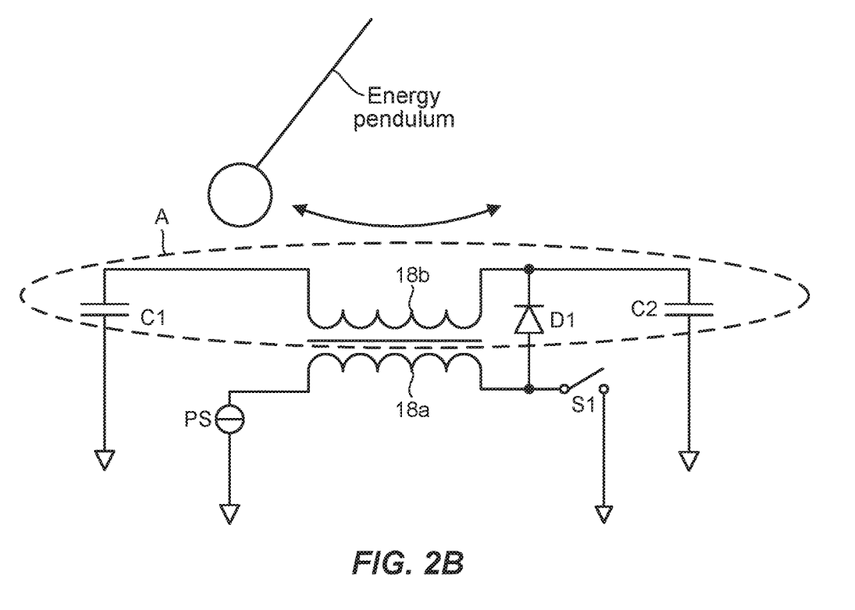
FIG. 2B is a schematic diagram of an example circuit according to an embodiment.

FIG. 2B illustrates a resonance circuit embodiment to demonstrate particular operation of particular features of first and second coil windings 18a and 18b according to an embodiment of stator tooth 16 and a simple driver circuit, such as may be used to apply torque to a rotor. A magnetic force may be induced responsive to changes in current through second coil winding 18b. The induced magnetic force may apply a torque to one or more rotor teeth (e.g., rotor tooth 20a or 20b in FIG. 1). Additionally, energy that is not used or lost in inducing the magnetic field may be captured in a charge storage device, such as a capacitor. Charge storage devices C1 and C2 represent devices, such as capacitors, capable of storing and discharging a charge. Therefore, the top portion A (shown with dotted line) of FIG. 2B may be capable of acting as an energy pendulum in which charge may be stored in C1 or C2, alternatively. While charge is in transit through second coil winding 18b, a change in current through second coil winding 18b may induce an electromagnetic force, applying a torque to one or more rotor teeth.

While energy in the resonance circuit may be converted to work or lost as charge oscillates between C1 and C2, the lower portion of FIG. 2B may be capable of introducing additional energy as current into second coil winding 18b. In one embodiment, a ratio of turns about stator tooth 16 of first coil winding 18a to turns about stator tooth 16 of second coil winding 18b may be selected to achieve a step-up transformer effect. For instance, acceptable ratios may include, but are not limited to, 1:2, 1:3, 1:5, and 1:10. Thus, an electric and magnetic field (EMF) responsive to changing current in first coil winding 18a may generate a desired current in second coil winding 18b that may be added to current between charge storage devices C1 and C2. For instance, in one embodiment, second coil winding 18b may have 10× more turns than first coil winding 18a, such as to enable an increased voltage on second coil winding 18b. Of course, any other appropriate ratio may be selected according to desired operation and operational parameters (e.g., input voltage, desired output voltage, etc.), and claimed subject matter is not limited in this respect.

Table 1 illustrates charge location in the resonance circuit of FIG. 2B at a plurality of points in time, $t_i$. For simplicity, it is assumed that the resonance circuit is a simplified ideal circuit. Accordingly, in one embodiment, at a first time $t_0$, a first voltage $V_1$ may be stored in charge storage device C1. Charge storage device C1 may tend to equalize its voltage with that of charge storage device C2. Therefore, at a second time $t_1$, charge may be driven from charge storage device C1 through second coil winding 18b. Changes in current in second coil winding 18b may induce a magnetic force, applying a torque to a rotor. Once charged, however, second coil winding 18b may tend to discharge and drive charge back to charge storage devices C1 and/or C2. As such, at a third time, $t_2$, charge may be driven to charge storage device C2. Thus, a second voltage (e.g., $V_2$, where $V_1 \approx -V_2$) may be stored at charge storage device C2. At a fourth time, $t_3$, additional charge may be generated in second coil winding 18b. For instance, current may be affected in second coil winding 18b by driving a current from a power source PS (e.g., a battery) through first coil winding 18a. The current generated in second coil winding 18b (e.g., corresponding to a voltage $V_3$ across terminals of second coil winding 18b) may then be added to or otherwise combined with the charge oscillating between charge storage devices C1 and C2 (e.g., referred to as an energy pendulum in FIG. 2A), such as to facilitate operation of the electric motor. The arrangement of PS, 18a, S1, C2 and D1 in FIG. 2B may form what may be referred to as a switched inductor boost circuit. As such, while current may be generated in second coil winding 18b responsive to an EMF, current in second coil winding 18b may also be based at least partly on current generated from the switched inductor boost circuit. Thus, in one implementation, diode D1 may serve to keep current from being generated in first coil winding 18a and diode D1 may also serve as part of the switched inductor boost circuit to transfer charge from the switched inductor boost circuit to the top portion A, as shall be discussed in greater detail hereinafter in relation to FIG. 5.

Figure 3:
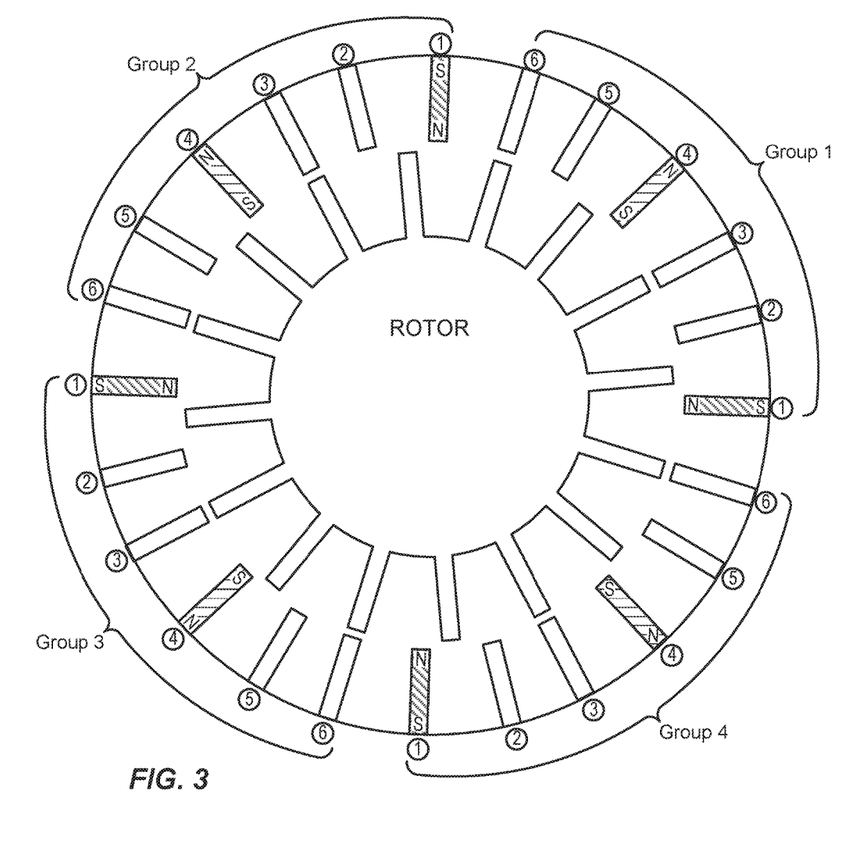
FIG. 3 illustrates an electric motor embodiment.

Some embodiments may employ one or more driver circuits to coordinate current pulses through coil windings (e.g., coil windings 18a and/or 18b) of a plurality of stator teeth to engender movement (e.g., rotation) of a rotor relative to a stator. FIG. 3 is a radial view of a rotor section and teeth of a stator section of an electric motor and shows a plurality of rotor teeth arranged in proximity to a plurality of stator teeth. The electric motor embodiment of FIG. 3 has twenty-four stator teeth and sixteen rotor teeth. However, these are merely examples of numbers of stator teeth and rotor teeth that may be implemented in a motor, and claimed subject matter is not limited in this respect. For ease of explanation, the stator teeth have been divided into four groups, group numbers 1, 2, 3, and 4, and individual stator teeth within each group have been numbered 1 through 6. As shall be discussed in more detail below with reference to FIG. 5, driver circuits associated with a stator coil in a group may be provided on a single board and may share control circuitry and, potentially, a single DC power supply. FIG. 3 illustrates a snapshot of one stage of a six stage cycle in which a stator coil winding of a first stator tooth in each group (labelled 1 in FIG. 3) is powered in a first direction (a first portion of an oscillation cycle) in this embodiment. The resulting magnetic field induced in the stator tooth is oriented north (N) radially inwards and south (S) radially outwards. A fourth stator tooth has a stator coil winding in each group that is approximately simultaneously powered in an opposite direction (a second portion of an oscillation cycle with an opposite EMF to that of the first portion) in this

TABLE 1

| Time $t_i$ | Charge in volts (V) | | |
| --- | --- | --- | --- |
| | $C_1$ | 18b | $C_2$ |
| $t_0$ | $V_1$ | 0 V | 0 V |
| $t_1$ | 0 V | $V_1$ | 0 V |
| $t_2$ | 0 V | 0 V | $V_2$ |
| $t_3$ | 0 V | $V_3$ | $V_2$ | embodiment. The magnetic field induced in the stator teeth is orientated south (S) radially inwards and north (N) radially outwards. Driving current through stator coil windings of this electrical motor may continue, as desired, in this paired opposing induced magnetism fashion to facilitate further rotor rotation relative the stator. For example, at a next stage, current may be driven through stator coil windings of stator teeth 2 and 5 (oppositely with respect to one another), followed by stator teeth 3 and 6, followed by stator teeth 1 and 4 (in the opposite magnetic configuration to the first phase) and so on. It is noted that in an embodiment it may be possible to arrange driver circuits and stator teeth with mutually coupled coil windings, to achieve more efficient operation with comparatively smaller current pulses. This may be achieved in one implementation by configuring paired driver circuits to be out-of-phase (e.g., a first driver circuit coupled to coil windings of stator tooth 1 of group number 1 to have a first phase, and a second driver circuit coupled to coil windings of stator tooth 4 of group number 4 to have a second phase, different from the first). It should be appreciated, therefore, that this arrangement may yield more efficient operation by allowing pairing of out-of-phase EMF on corresponding stator teeth and thus using less current (e.g., only using a current pulse of 1 mA driven to stator tooth 1 from a corresponding driver circuit, rather than pulsing two times 1 mA to drive current to both stator teeth 1 and 4 from the corresponding driver circuits).

We point out that the configuration in FIG. 3 of the rotor and stator teeth (in particular the 2:3 ratio of their number) may result in an arrangement in which when half of the rotor teeth are directly aligned with corresponding stator teeth, the other half of the rotor teeth are unaligned with the stator teeth (being aligned with the center of a gap between two stator teeth in this embodiment). For an aligned pair of rotor/stator teeth this means that there may be a relatively small air gap (e.g. less than 0.5 mm) between a rotor tooth and a stator tooth, which may correspond to a low reluctance and hence no output power (zero torque) from the motor. Conversely the non-alignment of the other stator teeth of the set of six stator teeth with corresponding rotor teeth can thus provide a high reluctance and high torque configuration (e.g., due to the larger air gap, of more than 1.0 mm, by way of example) between the non-aligned stator/rotor teeth. Some switched reluctance electric motors may include partial overlap between rotor and stator teeth to keep the motor in a configuration where reluctance is low for an acceptable efficiency. Nevertheless, torque may still be achieved, although at a level below the maximum possible, the present electrical motor system achieves an improved trade-off between torque and efficiency by providing a configuration in which higher torque can be generated (by the non-aligned stator/rotor teeth), but also in which energy that is expended in generating a magnetic field that is not used may be captured or reused, thus improving the efficiency.

Figure 4:
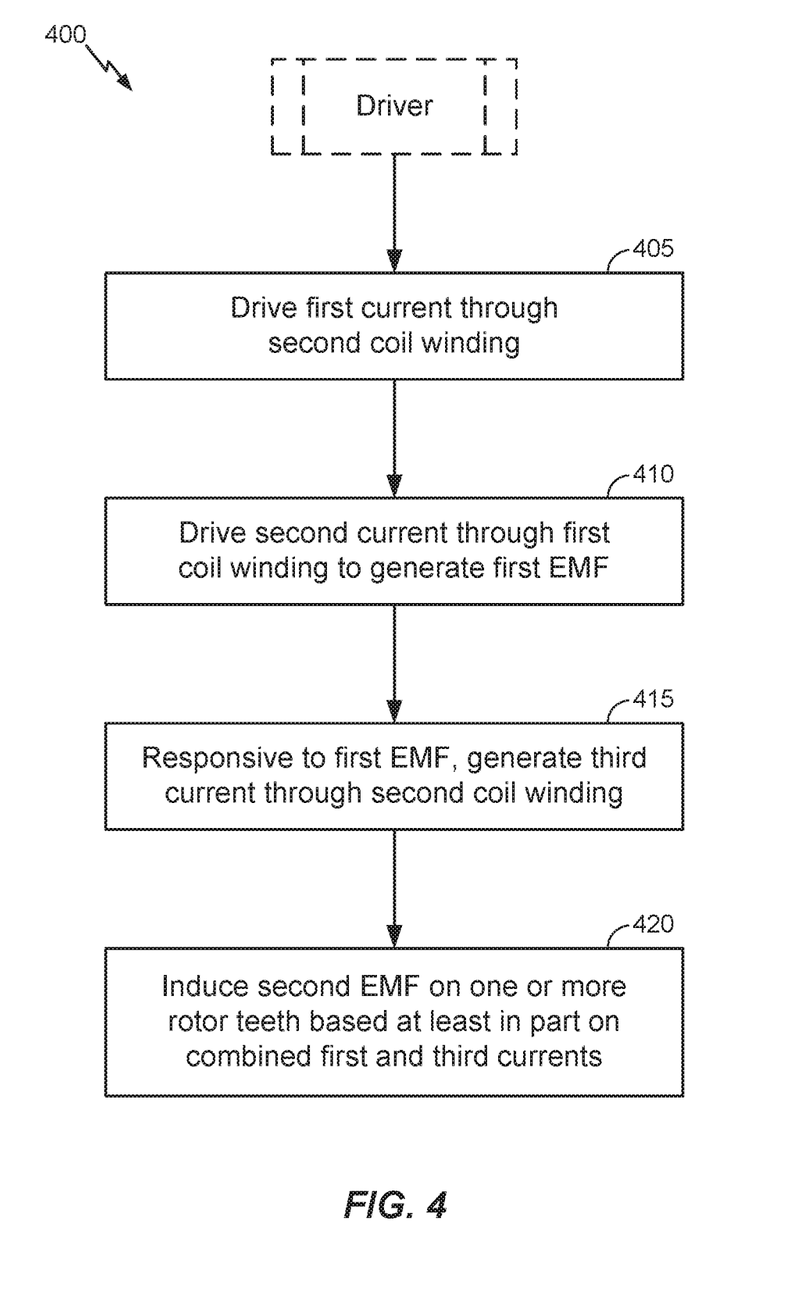
FIG. 4 is a flow diagram illustrating a method of engendering rotation of a rotor relative to a stator for one electric motor embodiment.

FIG. 4 illustrates a process 400 according to one embodiment for rotating a rotor relative to a stator, such as rotor 12 and stator 14 of FIG. 1, including transmission of current pulses, such as, by way of non-limiting example, DC current pulses, to a plurality of coil windings of a stator tooth.

At block 405, current from a driver process is driven through a first coil winding (e.g., first coil winding 18a). By way of non-limiting example, charge may be driven from a charge storage device, such as charge storage devices C1 or C2 in FIG. 2B, through a second coil winding (e.g., second coil winding 18b). A change in current may induce an attractive or repulsive force between the second coil winding and a rotor tooth. The charge driven through the second coil winding may be captured in a charge storage device (e.g., one or more capacitors), such as to be reused in further cycles to induce an electromagnetic force on a rotor tooth.

At block 410, a current is driven through the first coil winding, such as part of a charge up cycle to induce current in the second coil winding. Responsive to changes in current on the second coil winding, an EMF may be generated.

Similar to the discussion of a transformer-like effect, discussed above, at block 410, responsive to the EMF from the charge up cycle (e.g., block 410), a current may be induced on the second coil winding mutually coupled to the first coil winding. Thus, if a number of turns of the second coil winding is greater (e.g., 10× greater) than the number of turns of the first coil winding, a step-up transformer effect may be created to engender a higher voltage on the second coil winding than the first coil winding.

At block 420, a variation in a combined current in the second coil winding may generate an EMF to rotate a rotor (e.g., rotor 12 of FIG. 1) relative to a stator.

Figure 5:
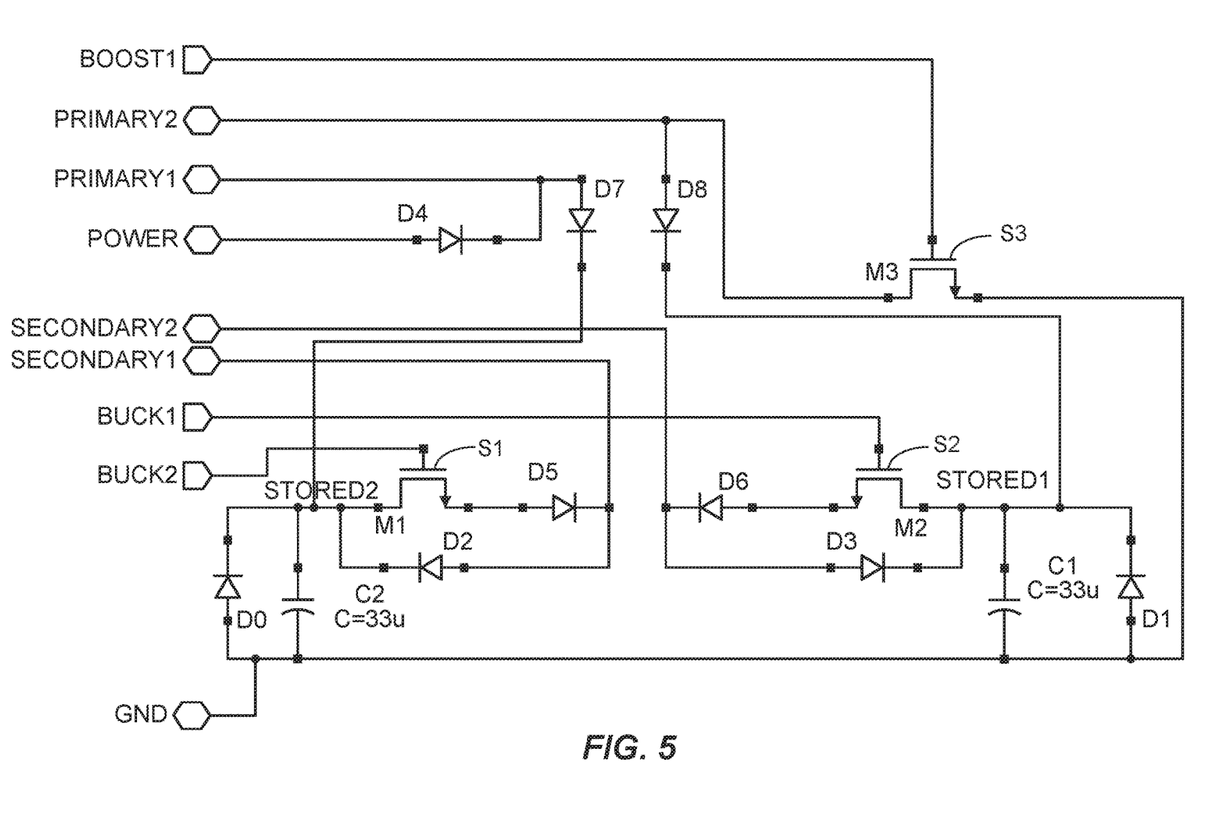
FIG. 5 is a circuit schematic for a driver embodiment.

According to an embodiment, first and second coil windings 18a and 18b of stator tooth 16 may form a mutually inductive coil winding pair as described above with reference to FIG. 2A. With operation of mutually inductive first and second coil windings 18a and 18b in mind, FIG. 5 illustrates an example driver circuit 500 according to one embodiment for maintaining an oscillating current through second coil winding 18b to generate an EMF. Even though they are not shown in FIG. 5, for simplicity, a first coil winding to be coupled to terminals PRIMARY1 and PRIMARY2 is referred to as first coil winding 18a. A second coil winding to be coupled to terminals SECONDARY1 and SECONDARY2 is referred to as second coil winding 18b. Driver circuit 500 may comprise a plurality of switches, S1, S2, and S3 operating as conducting elements (e.g., implemented by MOSFETS M1, M2, and M3), a plurality of charge storage devices (e.g., capacitors), such as charge storage devices C1 and C2, and a plurality of diodes D0-D8.

Driver circuit 500 may also be capable of coupling to first and second coil windings 18a and 18b. For instance, first coil winding 18a may be electrically coupled to terminals PRIMARY1 and PRIMARY2. Second coil winding 18b may be electrically coupled to terminals SECONDARY1 and SECONDARY2. In one embodiment, for example, driver circuit 500 may be electrically coupled to first coil winding 18a and second coil winding 18b of FIG. 1.

In a particular context of usage, such as a particular context in which tangible components are being discussed, the terms "coupled" and "connected" are used in a manner so that the terms are not necessarily synonymous. Similar terms may also be used in a manner in which a similar intention is exhibited. Thus, "connected" is used to indicate that two or more tangible components and/or the like, for example, are tangibly in direct physical contact. Thus, by way of example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context.

Switches usable in driver circuit 500 may operate as conducting elements, such as FETs, to permit current to pass between source and drain terminals based, at least in part, on a voltage applied to a gate terminal. It should be understood, however, that other types of devices such as a bipolar transistor, thyristor, diode, variable resistor, etc. may be used as a conducting element, and that claimed subject matter is not limited in this respect. In this context, a switch may comprise a conducting element having first and second terminals may form a connection between the first and second terminals by providing a conductive path between the first and second terminals having a very small or negligible impedance for a particular signal. In one particular example implementation, a conductive element may vary in impedance between the first and second terminals based, at least in part, on a signal provided to a third terminal of the conductive element (e.g., based on a voltage or current applied to a third terminal). In one aspect, a conductive element may "close" to thereby connect first and second terminals in response to a signal provided on the third terminal. Likewise, a conductive element may "open" to thereby disconnect first and second terminals in response to a different signal provided on the third terminal. In one aspect, a conductive element in an open state may isolate a first portion of a circuit from a second portion of the circuit by removing or disrupting a conductive path between the first and second portions of the circuit. In another aspect, a conducting element may vary an impedance between first and second terminals between opened and closed states based on a signal provided to a third terminal.

A source of current, such as a power source, may be electrically coupled to terminals BOOST1, BUCK1, BUCK2, and/or POWER. In one embodiment, power provided to driver circuit 500 via terminals BOOST1, POWER, BUCK1, and/or BUCK2 may comprise DC power. For instance, power may be provided, via one or more of terminals BOOST1, POWER, BUCK1, and/or BUCK2, based at least in part on a control circuit (not shown) capable of managing timing of current pulses and/or amplitude thereof. It is noted that the terms "boost" and "buck" are used merely for illustration and are not to be taken in a limiting sense. Indeed, as shall be shown, one embodiment of a driver 500 may not necessarily function as a pure "buck" and/or "boost," in spite of the use of the term.

In one embodiment, oscillation of current through second coil winding 18b may be maintained using a circuit of driver 500, as mentioned above. For example, if charge is stored in charge storage devices C1 and C2 such that there is a differential voltage across nodes STORED1 and STORED2 (e.g., across terminals of charge storage devices C1 and C2), for example, and we assume that terminals SECONDARY1 and SECONDARY2 are shorted, charge storage devices C1 and C2 may tend to equalize stored charge. However, if a second coil winding 18b is electrically coupled between terminals SECONDARY1 and SECONDARY2, and charge storage devices C1 and C2 are arranged around the second coil winding 18b, as charge storage devices C1 and C2 equalize, second coil winding 18b is charged. And if, for example, charge storage devices C1 and C2 are equalized and second coil winding 18b electrically coupled to terminals SECONDARY1 and SECONDARY2 is charged, second coil winding 18b may tend to discharge while driving charge from second coil winding 18b back onto charge storage devices C1 and/or C2 (such as to create a differential voltage across charge storage devices C1 and C2).

Electrical resonance by charge storage devices C1 and C2, and second coil winding 18b electrically coupled to terminals SECONDARY1 and SECONDARY2 may, in at least some cases, enable efficient use of input power (e.g., from a power source) such as by capturing and reusing stored charge to affect current in second coil winding 18b. For example, electrical resonance may be used to oscillate charge between charge storage devices C1 and C2 and second coil winding 18b coupled between charge storage devices C1 and C2. In one embodiment, charge may oscillate between storage devices C1 and C2 through second coil winding 18b for a plurality of cycles while charging and discharging second coil winding 18b electronically coupled between the charge storage devices C1 and C2.

One or more switches of driver 500 may be used to manage oscillation cycles between a first portion of a current oscillation cycle (e.g., while there is a differential voltage across charge storage devices C1 and C2), and a second portion of a current oscillation cycle (e.g., while voltage between charge storage devices C1 and C2 is equalized). In one embodiment, switches for managing oscillation cycles between charge storage devices C1 and C2 may comprise one or more transistors (e.g., MOSFETs or BJTs) or thyristors, by way of non-limiting example. As illustrated in FIG. 5, switches S1 and S2 may comprise MOSFETs (e.g., N-type FETs). Switches S1 and S2 may be capable of controlling oscillation or cycles of electrical resonance between charge storage devices C1 and C2 to drive current in second coil winding 18b. It should be understood, however, that different types of switches may be used for maintaining transfer of charge between charge storage devices C1 and C2 and second coil winding 18b, and that claimed subject matter is not limited in this respect.

In one embodiment, there may be a desire to protect charge storage devices C1 and C2, such as against reverse bias, and one or more protection devices, such as diodes D0 and D1, may be arranged relative switches S1 and S2 and charge storage devices C1 and C2 to provide reverse bias protection. Diodes D2 and D3 may be arranged relative to second coil winding 18b electrically coupled to terminals SECONDARY1 and SECONDARY2 and charge storage devices C1 and C2. This arrangement may facilitate an equalization cycle, such as by allowing charge from one charge storage device C1 or C2 to travel to the other charge storage device C1 or C2 (see, for example, diode D1 in FIG. 2B). While using MOSFETs M1 and M2 as switches S1 and S2 may be desirable for low cost and low complexity, among other things, they may be less robust than other switching mechanisms (e.g., insulated gate bi-polar transistor (IGBT)). Accordingly, diodes D5 and D6 may be used to protect switches, such as MOSFETs M1 and M2, from currents outside of particular operating ranges. Of course, it should be understood that in some embodiments, driver 500 may be capable of operating without diodes D5 and D6.

As discussed above, a lower voltage may be stepped up to a higher voltage such as part of a charge up cycle as was discussed in relation to FIG. 2B. For example, current may be generated in second coil winding 18b responsive to current changes in first coil winding 18a in order to replenish charge oscillating between charge storage devices C1 and C2 and second coil winding 18b. Thus, in one embodiment, to facilitate a changing current on second coil winding second coil winding 18b electrically coupled to terminals SECONDARY1 and SECONDARY2, one or more current pulses may be driven through first coil winding 18a coupled to terminals PRIMARY1 and PRIMARY2. Current generated on second coil winding 18b responsive to changing current on first coil winding 18a may be added to current already oscillating between charge storage devices C1 and C2 and second coil winding 18b.

As discussed above, characteristics of a mutually coupled coil winding pair may be selected to achieve a desired charge up cycle and/or desired oscillation of current through second coil winding 18b of the mutually coupled coil winding pair. In one embodiment, the first and second coil windings 18a and 18b may be wound in opposing directions. For example, first coil winding 18a may be wound about a stator tooth in a first direction (e.g., clockwise) while second coil winding 18b may be wound about the stator tooth in a second/opposite direction (e.g., counterclockwise). Additionally, in one embodiment, second coil winding 18b may comprise a greater number of turns about the stator tooth than first coil winding 18a. A ratio of turns of second coil winding 18b to turns of first coil winding 18a may be 2:1, 5:1, 10:1, etc., by way of non-limiting example.

As pointed out above, at least partly, due to an arrangement of first and second coil windings 18a and 18b as a mutually coupled coil winding pair, responsive to a magnetic field from first coil winding 18a, a current may be induced in second coil winding 18b.

Figure 7:
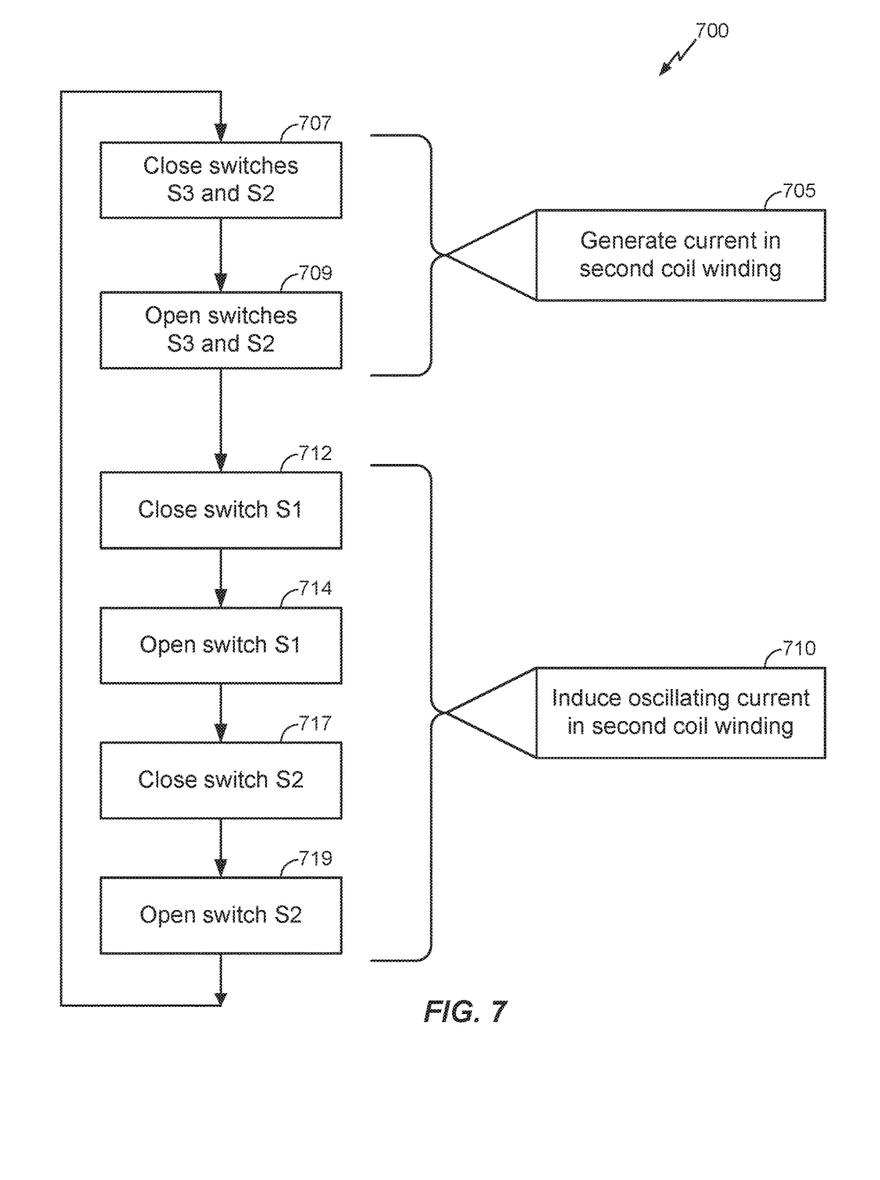
FIG. 7 is a flow diagram illustrating a method of operating a driver circuit embodiment.

FIG. 7 illustrates a method 700 whereby current may be generated in second coil winding 18b, as indicated by block 705, and oscillation of current in second coil winding 18b may be induced, as indicated by block 710. As discussed above, the current oscillating in second coil winding 18b may induce an electromagnetic force and provide a torque on one or more teeth of a rotor.

In one embodiment, switches S2 and S3 of driver circuit 500 may facilitate generation of current in second coil winding 18b, as indicated by block 705, as part of a charge up cycle. To initiate the charge up cycle, switches S2 and S3 may be closed to drive a current through first coil winding 18a. To close switches S2 and S3, voltages on terminals BUCK1 and BOOST1 may be raised. Closing of switches S2 and S3 is represented in block 707 of method 700 in FIG. 7. As a result of closing switches S2 and S3, charge is driven through first coil winding 18a, coupled to terminals PRIMARY1 and PRIMARY2.

After current is driven through first coil winding 18a, switches S2 and S3 may be opened, such as to disconnect terminals thereof. Closing and/or opening switches S2 and S3 may affect changes in current in first coil winding 18a. Since first and second coil windings 18a and 18b form a mutually inductive pair, changes in current in first coil winding 18a may affect current at second coil winding 18b, thus adding charge for the current oscillating in second coil winding 18b.

Similar to the energy pendulum in FIG. 2A, block 710 indicates an approach for inducing and controlling oscillation of current between charge storage devices C1 and C2 and through second coil winding 18b. After block 709, a differential voltage is stored across charge storage devices C1 and/or C2. At block 712, switch 1 is closed, and charge is driven through second coil winding 18b. As charge travels through second coil winding 18b, an EMF may be induced corresponding to a change in current and may provide a torque on a rotor. In order to avoid the induced EMF on second coil winding 18b from inducing current on first coil winding 18a, diodes D4 and D7 may be arranged in driver circuit 500 around terminals PRIMARY1 and PRIMARY2.

As was explained above in relation to FIG. 3, it may be desirable to provide torque pulses at desired times. For instance, applying a torque to a rotor tooth in close proximity to a stator tooth might impede rotor rotation. Also, it might be desirable to maintain a particular time in between applications of torque to charge up second coil winding 18b. In one embodiment, charge may be retained in charge storage devices C1 and/or C2 such that little to no charge passes through second coil winding 18b. Thus, by holding charge in charge storage devices C1 and/or C2, little or no magnetic force is induced by second coil winding 18b. As noted earlier, charge may be driven to charge storage devices C1 and C2 as second coil winding 18b discharges. To hold charge in charge storage devices C1 and/or C2, switch S1 may be opened, as indicated at block 714, thus resulting in a differential voltage across terminals of charge storage devices C1 and/or C2.

When it is desired to apply another torque to a rotor tooth, charge may be driven from charge storage devices C1 and/or C2 through second coil winding 18b. Driving charge through second coil winding 18b may produce a changing current. The changing current through second coil winding 18b may contribute to an EMF and apply a torque to a rotor tooth. The torque applied to the rotor tooth may arise from an attractive or repulsive force. At block 717 switch S2 may be closed to drive charge stored in charge storage devices C1 and/or C2 through second coil winding 18b.

After applying a torque by second coil winding 18b, it may be desirable to cease application of the torque, such as by transferring charge from second coil winding 18b to charge storage devices C1 and/or C2. Similar to as was illustrated above by the example of block 714, in one implementation, switch S2 may be opened to allow charge to travel from second coil winding 18b to charge storage devices C1 and/or C2. At block 719, switch S2 may be opened, such as by reducing a voltage at terminal BUCK1 of driver 500.

After driving current through second coil winding 18b for one or more cycles, it may be desired to introduce additional charge, such as by way of operation discussed above at block 705. In one embodiment, driver operation discussed at blocks 705, 707, and 709 may generate additional current in second coil winding 18b via a transformer effect with mutually coupled first coil winding 18a. As was discussed above in relation to FIG. 2B, in one embodiment a combination of a transformer effect and a switched inductor boost circuit may serve to generate additional current in second coil winding 18b. FIG. 5 illustrates an example boost circuit comprising switch S3, a power source coupled to terminal POWER, first coil winding 18a (e.g., coupled to terminals PRIMARY1 and PRIMARY2), diode D8, and charge storage device C1. Thus, it should be appreciated that different portions of the circuit in FIG. 5, may perform more than one function. By way of non-limiting example, charge storage device C1, may both operate in conjunction with second coil winding 18b and charge storage device C2 to oscillate current and may also operate in conjunction with other portions of a switched inductance boost circuit to generate additional current in second coil winding 18b.

As discussed above, it may be desirable to synchronize cycles and oscillations of charge between charge storage devices C1 and/or C2 and second coil winding 18b. As noted above, some components of driver 500 may be sensitive to operation within specified ranges. Conversely, some components might not function properly, or even break, if operated outside of specified ranges. For example, certain switches, like FETs, may be susceptible to current and/or voltages outside of operating ranges. Additionally, some charge storage devices, like certain capacitors by way of example, might be unable to store charges above a certain amount. Thus, it may be desirable to allow charge storage devices C1 and/or C2 to transfer charge to equalize charge across charge storage devices C1 and C2, such as between cycles of oscillating charge between charge storage devices and second coil winding 18b. For example, in one case, and as shown at blocks 712 and 717 of method 700 in FIG. 7, closing a switch (switch S1 at block 712 and switch S2 at block 717) may enable charge storage devices C1 and/or C2 to transfer charge and equalize voltage, such as to avoid accumulating charge in charge storage devices C1 and C2 that is in excess of operation ranges. Switches S1 and/or S2 of driver 500 may be held open for a period of time that is long enough to allow desired charge transfer.

As discussed above, an example electric motor may comprise two coil windings per stator tooth. The coil windings may be arranged as a mutually inductive coil winding pair, and may be driven by a driver, such as driver 500. Thus, an embodiment in which the stator has twenty-four stator teeth may comprise twenty-four drivers. Of course, while the drivers may be formed on separate devices, in some cases it may be desirable to form multiple drivers (e.g., multiple drivers 500) on a single device. For example, multiple drivers may be formed in a single device using any one of several suitable CMOS processing technologies, for example. In other implementations, multiple drivers may be formed along with a processor (e.g., digital controller or microprocessor core) on a single device (e.g., as a system on a chip). Such a processor may provide signals (e.g., to terminals BUCK1, BUCK2 and BOOST1) to control the opening and closing of switches (e.g., control of opening and closing switches S1, S2 and S3 according to FIG. 7) for multiple drivers controlling coil windings for multiple stator teeth of a motor. In a particular implementation, such a single device integrating a processor and multiple drivers may comprise a package with multiple external terminals (e.g., a ball grid array package) mountable to a printed circuit board. For example, the external terminals of the package may be coupled to capacitor devices (e.g., to perform the functions of charge storage devices C1 and C2), first and second coil windings of respective stator teeth (e.g., first and second coil windings 18a and 18b) and a power supply that are integrated with a motor. Of course, other embodiments are contemplated by the present description, such as, for example, drivers capable of coupling to a plurality of coil winding sets. The coil winding sets may be electrically coupled in series or parallel, such as to accommodate larger and/or fewer drivers, etc., such as according to design constraints.

Figure 6:
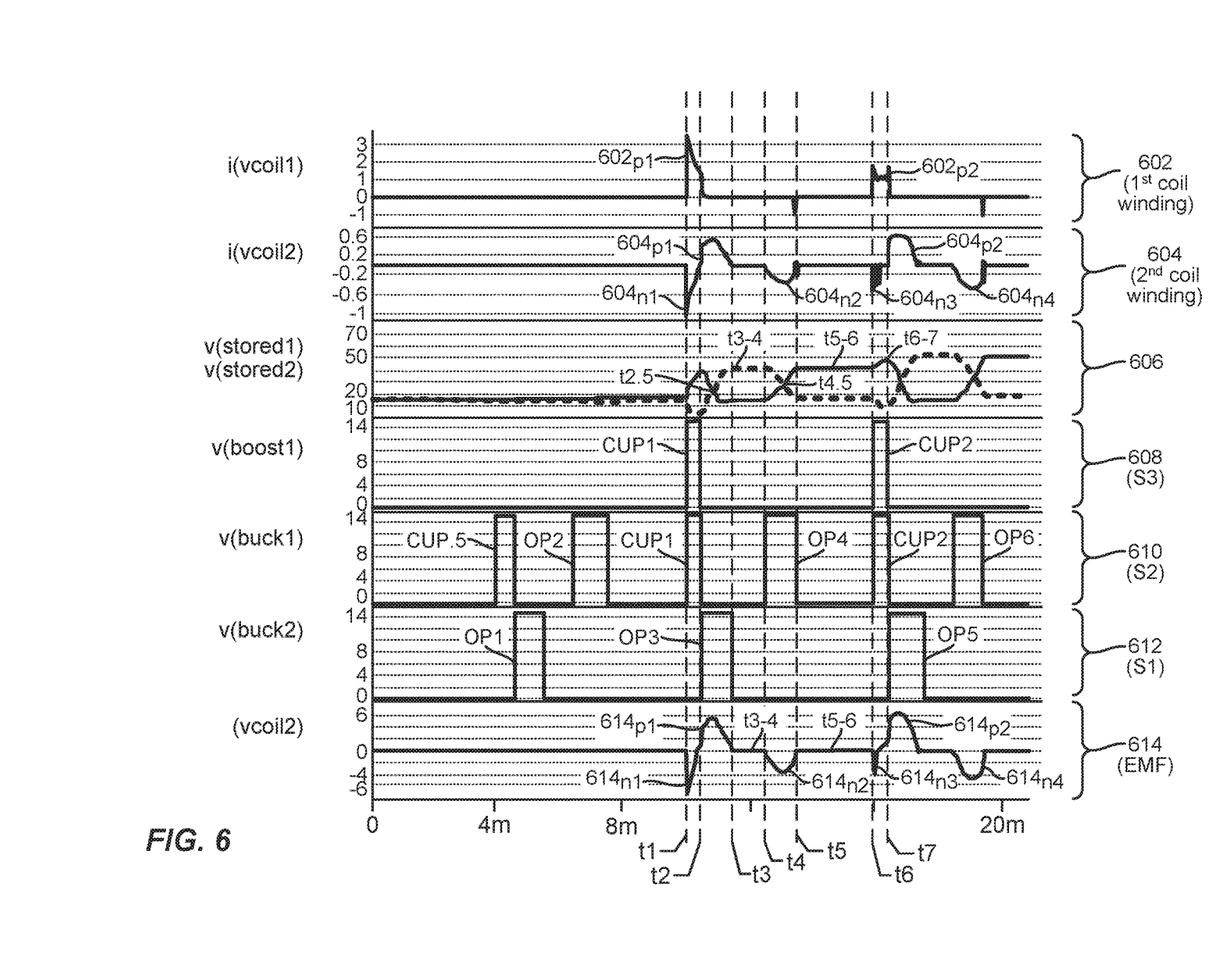
FIG. 6 is a timing diagram for a driver and electric motor embodiment.

FIG. 6 is a timing diagram for an example driver coupled of a mutually inductive coil winding pair, such driver 500 shown in FIG. 5 and first and second coil windings 18a and 18b of FIG. 1. The timing diagram in FIG. 6 shows several plots to illustrate how an exemplary driver coupled to a mutually inductive coil winding pair may operate. Plot 602 illustrates current in a first coil winding (e.g., first coil winding 18a in FIG. 1), and plot 604 illustrates a current in a second coil winding (e.g., second coil winding 18b in FIG. 1). Plots 606 include a first plot and a second plot illustrating a differential voltage across charge storage devices arranged around second coil winding 18b, such as charge storage devices C1 and C2 in FIG. 5. Plots 608, 610, and 612 illustrate opening and closing of switches S1, S2, and S3 of a driver (e.g., MOSFETs M1, M2, and M3), such as driver 500 in FIG. 5. Plot 614 illustrates a value proportional to a magnetic field engendered on second coil winding 18b (e.g., note that the form and pattern of plot 614 corresponds to that of plot 604, which, as noted above, illustrates current in second coil winding 18b).

Looking first at plot 614, several positive peaks 614p1 and 614p2 are indicated. Peaks 614p1 and 614p2 indicate an EMF induced on a second coil winding (e.g., second coil winding 18b). For instance, by way of illustration, peak 614p1 may correspond to an EMF induced at stator teeth 1 of group numbers 1, 2, 3, and 4 in FIG. 3 (e.g., with a south (S) polarity radially inwards towards rotor teeth, and a north (N) polarity radially outwards away from rotor teeth). Thus, in the embodiment shown in FIG. 3, four drivers (e.g., corresponding to stator tooth 1 of groups numbers 1, 2, 3, and 4) may generate EMF on second coil winding 18b as shown by peak 614p1. While, at approximately a same time, four different drivers (e.g., corresponding to stator tooth 4 of group numbers 1, 2, 3, and 4) may be out-of-phase and generate EMF opposite to that of peak 614p1 (e.g., peak 614n2) on corresponding second coil winding 18b. Meanwhile, the remaining drivers (e.g., corresponding to stator teeth 2, 3, 5, and 6) may not be exhibiting an EMF. Configuring a pair of driver circuits to be out-of-phase as to each other might be desirable for efficiency, as noted above. Further, an out-of-phase arrangement might be desirable to filter ripple, for example.

Of note, immediately prior to each positive EMF pulse (e.g., 614p1, 614p2, etc.), a very narrow negative pulse is shown, as shown by 614n1 and 614n3. These narrow negative peaks or "blips" correspond to a charging up cycle in which a current in generated on second coil winding 18b in response to current being driven through first coil winding 18a, such as was discussed above in relation to FIG. 2B. Nevertheless, the magnitude of these pulses decreases as more charge is generated on second coil winding 18b via the charge up cycle.

The negative EMF pulses 614n2 and 614n4 of plot 614 may be capable of creating an oppositely arranged force as compared to pulses 614p1 and 614p2. For example, returning to FIG. 3, and as explained above, at a first time the stator tooth 1 may exhibit a force consistent with that shown in FIG. 3. However, at a subsequent moment in time, stator tooth 1 may exhibit an opposite force, such as corresponding to a negative EMF pulse like those of 614n2 and 614n4 in plot 614. Of note, in some cases, while the magnitude of the negative "blip" pulses (e.g., 614n1 and 614n3) may decrease over time as the resonance circuit charges, as discussed above, the magnitude of the EMF pulses, like pulses 614n2, 614p2, 614n4, etc., may increase over time. In some implementations, as the negative "blip" pulses corresponding to charge up cycles decrease over time, charge introduced in subsequent charge up cycles may instead add to subsequent EMF pulses, such as at the beginning of a subsequent positive or negative EMF pulse to provide a torque to a rotor. A controller or processing element may control switching behavior of a driver in order to coordinate inducement of EMF pulses on a given stator tooth.

Plots 602 and 604 illustrate how the EMF pulses of plot 614 may be induced. Looking first at plot 604, which represents current present on a second coil winding (e.g., coil winding 18b), the positive current pulses 604p1 and 604p2 correspond to the EMF pulses 614p1 and 614p2. Similarly, the negative current pulses 604n2 and 604n4 correspond to the EMF pulses 614n2 and 614n4.

Additionally, the negative blips 604n1 and 604n3 correspond to the charge up cycle, and decrease as more and more charge is generated on second coil winding 18b responsive to current driven through first coil winding 18b (e.g., 604n3 is smaller than 604n1, etc.). For example, referring to plot 602, it is noted that current pulses 602p1 and 602p2 on the first coil correspond to the negative blips 604n1 and 604n2 on second coil winding 18b. This relationship illustrates how the charge up cycle may function as current is driven through first coil winding 18a, an opposing current may be generated on second coil winding 18b.

To illustrate how the current pulses on first and second coil windings 18a and 18b may be derived, reference is made to plots 606, 608, 610, and 612.

The oscillation of current between charge storage devices C1 and/or C2 and a second coil winding (e.g., second coil winding 18b) may be illustrated by comparing to plots 614 and 606. As has already been described at some length, driver 500 may be configured to oscillate current between charge storage devices C1 and/or C2 and second coil winding 18b. Thus, peaks in EMF should correspond to points in time with roughly equal voltage across charge storage devices C1 and C2. And referring to FIG. 6, this appears to be the case. Referring to plots 606, two particular points in time, t2.5 and t4.5 are indicated. Points t2.5 and t4.5 represent points in time at which a charge on first charge storage device C1 equals that of second charge storage device C2 (e.g., voltage is roughly equalized across the charge storage devices). As should be apparent, these points correspond to the peak of 614p1 and 614n2, respectively.

Another aspect of note of plots 606 is the length in time indicated by t3-4 and t5-6. By comparison to plot 614, it should be apparent, that at t3-4, no EMF is present on plot 614. Similarly, at t5-6, plots 606 show a differential voltage maintained across the charge storage devices C1 and/or C2 and no EMF on plot 614. However, the duration of t3-4 is less than that of t5-6. The difference in duration (e.g., of maintaining a differential voltage across the charge storage devices) may be useful, such as to provide sufficient time for a charge up cycle. Of course, the timing and duration may also be dictated by stator and/or rotor tooth arrangement and orientation, among other things.

Still further, plots 606 show a small spike in differential value, such as at t6-7, as indicated. As should be apparent by reference to plot 602, the small spike in differential value corresponds to a charge up cycle. For example, t6-7 on plots 606 corresponds to peak 602p2 in plot 602. As additional charge is added through subsequent charge up cycles, the jump in differential voltage at the charge up cycles decreases comparatively.

Reference is made to plots 608, 610, and 612, which illustrate current pulses to open or close switches S3, S2, and S1, respectively. Plot 614 shows that EMF oscillation on second coil winding 18b begins with a negative peak 614n1 corresponding, as was discussed earlier, with a charge up cycle wherein current is driven through first coil winding 18a (see 602p1). At block 707 of method 700, a charge up cycle is initiated by closing switches S3 and S2. Closing switches S3 and S2 is shown by current pulses CUP1 in plots 608 and 610, occurring between t1 and t2. Thus, closing switches S3 and S2 corresponds to driving current through a first coil winding (e.g., first coil winding 18a).

At time t2, switches S3 and S2 may be opened and switch S1 may be closed, such as described in relation to blocks 709 and 712 of FIG. 7. The opening of switches S3 and S2 and closing of switch S1 is shown by pulses CUP1 in plots 608 and 610 dropping off at t2, and pulse OP3 occurring on plot 612 between t2 and t3. The peak 604p1 in plot 604 represents current driven through second coil winding 18b. And peak 614p1 on plot 614 shows a corresponding EMF spike between t2 and t3.

Subsequently, at time t3, switch S1 may be opened again, similar to the discussion of block 714 in FIG. 7. This point in the cycle may correspond to a differential voltage being maintained across charge storage devices C1 and/or C2.

At time t4, switch S2 is closed, corresponding to pulse OP4 in plot 610 (see, e.g., block 717 and related discussion). Referring to plot 604, negative peak 604n2 corresponds to the closing of switch S2. And negative peak 604n2 also corresponds to inducement of a force on second coil winding 18b, as shown by negative peak 614n2 in plot 614. Then, at time t5, switch S2 is opened again (see, e.g., block 719 in FIG. 7). Subsequently, an additional charge up cycle may be run by closing switches S3 and S2 again, as shown by CUP2 in plots 608 and 610.

It is noted that prior to time t1, plot 610 shows two pulses on switch S2, CUP.5 and OP2, and plot 612 shows one pulse OP1 on switch S1. It is notable that because prior to time t1 no charge has been generated in second coil winding 18b, the opening and/or closing of switches S3, S2, and S1 has little substantive effect on the EMF (or lack thereof) generated on first and second coil windings 18a and 18b. It is only after second coil winding 18b has been charged up that operation of switches S3, S2, and S1 facilitate oscillation of EMF, such as for rotating a rotor relative to a stator.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

One skilled in the art will recognize that a virtually unlimited number of variations to the above descriptions are possible, and that the examples and the accompanying figures are merely to illustrate one or more particular implementations for illustrative purposes. They are not therefore intended to be understood restrictively.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

CONCLUSION

As discussed above, an apparatus is disclosed herein. In one embodiment, the apparatus includes a first circuit and a second circuit arranged such that the second circuit is to be coupled to a second coil winding and to drive a first current through the to be coupled second coil winding; and the first circuit is to generate a first magnetic field in response to a second current in a first coil winding, and the first magnetic field is to generate a third current in the second coil winding constructively combining with the first current to provide a combined current in the second coil winding. The combined current is to induce a magnetic force against one or more rotor teeth to apply a torque relative to a stator tooth.

In some embodiments of the apparatus, the second circuit comprises a first charge storage device to charge while the first current flows through the second coil winding in a first direction and to discharge while the first current flows through the second coil winding in a second direction. The second circuit further comprises a second charge storage device to charge while the first current flows through the second coil winding in the second direction and to discharge while the first current flows through the second coil winding in the first direction.

In some embodiments of the apparatus, the first current is to be generated at least in part in response to a difference in a first voltage across terminals of the first charge storage device and a second voltage across terminals of the second charge storage device.

In some embodiments of the apparatus, the apparatus also comprises at least a first switch and a second switch to control initiation of cycles to equalize charge stored in first and second charge storage devices.

In some embodiments of the apparatus, the apparatus also comprises at least a third switch to power up the second circuit by starting current in the first coil winding.

In some embodiments of the apparatus, the third switch is arranged such that opening the third switch removes power from the first coil winding to engender an opposite EMF, in response to one or more current pulses from one or more of the first and second switches.

In some embodiments of the apparatus, the apparatus also comprises a first diode and a second diode arranged relative the first and the second switches for protection from power outside of an operation range of the first and second switches.

In some embodiments of the apparatus, the apparatus also comprises a diode arranged relative the third switch for protection from power outside of an operation range of the third switch.

In some embodiments of the apparatus, the second circuit comprises a first switch and a second switch to control electrical resonance between the first and second charge storage devices and the to be coupled second coil winding.

In some embodiments of the apparatus, the apparatus also comprises a diode arranged in the second circuit to facilitate transfer of the second current to the second circuit.

In some embodiments of the apparatus, the to be coupled second coil winding is to be arranged between the first charge storage device and the second charge storage device.

In some embodiments of the apparatus, the apparatus also comprises a first diode and a second diode arranged relative to the first and second charge storage devices to protect against a reverse bias.

In some embodiments of the apparatus, the apparatus also comprises a first diode and a second diode arranged to allow transfer of charge between the first and second charge devices.

In some embodiments of the apparatus, the apparatus also comprises: a first diode arranged between the first circuit and a first portion of the first coil winding, a second diode arranged between the first circuit and a second portion of the first coil winding, and a third diode arranged between a power source and the first circuit.

In some embodiments of the apparatus, the first, second, and third diodes are arranged to keep the induced magnetic force from generating a current on the first coil winding.

A method is also disclosed. One embodiment of the method comprises: driving a first current through a second coil winding of a stator tooth; and driving a second current through a first coil winding of the stator tooth, the second current inducing a third current in the second coil winding constructively combining with the first current to provide a combined current in the second coil winding. The combined current induces a magnetic force against one or more rotor teeth to apply a torque.

In some embodiments of the method, driving the first current to the second coil winding comprises opening at least one of a second switch or a third switch.

In some embodiments of the method, the method includes opening at least one of the second switch or the third switch to maintain a differential voltage across a pair of charge storage devices.

In some embodiments of the method, inducing the magnetic force comprises opening a first switch and the second switch and closing the third switch.

In some embodiments of the method, the method also comprises opening the second switch and maintaining a differential voltage across the pair of charge storage devices.

In some embodiments of the method, the method also comprises closing the first switch and allowing equalization of charge between the pair of charge storage devices.

In some embodiments of the method, the method also comprises allowing at least one of the pair of charge storage devices to fully discharge.

An electric motor is also disclosed. One embodiment of the electric motor comprises: a rotor comprising a plurality of rotor teeth; a stator comprising a plurality of stator teeth;

mutually coupled first and second coil windings wound about at least one of the plurality of stator teeth; and a driver circuit coupled to the mutually coupled first and second coil windings and comprising a plurality of charge storage devices. The driver circuit is to drive a first current on the first coil winding responsive to which a second current is induced on the second coil winding; and use electrical resonance between the plurality of charge storage devices and the second coil winding to engender an oscillating magnetic field to interact with one or more of the plurality of rotor teeth. The oscillating magnetic field is to be based, at least in part, on the generated second current.

In some embodiments of the electric motor, the number of turns of the second coil winding is greater than the number of turns of the first coil winding.

In some embodiments of the electric motor, the number of turns of the second coil winding is at least five times the number of turns of the first coil winding.

In some embodiments of the electric motor, the first current on the first coil winding is in the form of DC current.

In some embodiments of the electric motor, the mutually coupled first and second coil windings are wound about a same stator tooth of the at least one of the plurality of stator teeth.

What is claimed is:

1. An apparatus comprising:
a first circuit and a second circuit arranged such that:
the second circuit comprises a first charge storage device and is adapted to be coupled to a second coil winding to drive a first current through the second coil winding, the first current to be discharged from the first charge storage device; and
the first circuit is adapted to apply a second current to a first coil winding to induce a first magnetic field, the first magnetic field to generate a third current in the second coil winding to constructively combine with the first current to provide a combined current in the second coil winding;
wherein the combined current is to induce a magnetic force against one or more rotor teeth to apply a torque relative to a stator tooth.

2. The apparatus of claim 1, wherein the second circuit is adapted to enable the first charge storage device to charge while the first current flows through the second coil winding in a first direction and to discharge while the first current flows through the second coil winding in a second direction, and wherein the second circuit further comprises a second charge storage device to charge while the first current flows through the second coil winding in the second direction and to discharge while the first current flows through the second coil winding in the first direction.

3. The apparatus of claim 2, wherein the first current is to be generated at least in part in response to a difference in a first voltage across terminals of the first charge storage device and a second voltage across terminals of the second charge storage device.

4. The apparatus of claim 2 and further comprising at least a first switch and a second switch to control initiation of cycles to equalize charge stored in first and second charge storage devices.

5. The apparatus of claim 4 and further comprising at least a third switch to power up the second circuit by starting current in the first coil winding.

6. The apparatus of claim 5, and wherein the third switch is arranged such that opening the third switch is to remove power from the first coil winding to engender an opposite electric and magnetic field (EMF), in response to one or more current pulses from one or more of the first and second switches.

7. The apparatus of claim 4 and further comprising a first diode and a second diode arranged relative the first and the second switches for protection from power outside of an operation range of the first and second switches.

8. The apparatus of claim 6 and further comprising a diode arranged relative the third switch for protection from power outside of an operation range of the third switch.

9. The apparatus of claim 2, wherein the second circuit comprises a first switch and a second switch to control electrical resonance between the first and second charge storage devices and the second coil winding.

10. The apparatus of claim 7 and further comprising a diode arranged in the second circuit to facilitate transfer of the second current to the second circuit.

11. The apparatus of claim 2, wherein the second coil winding is to be arranged between the first charge storage device and the second charge storage device.

12. The apparatus of claim 2 and further comprising a first diode and a second diode arranged relative to the first and second charge storage devices to protect against a reverse bias.

13. The apparatus of claim 2 and further comprising a first diode and a second diode arranged to allow transfer of charge between the first and second charge devices.

14. The apparatus of claim 1 and further comprising: a first diode arranged between the first circuit and a first portion of the first coil winding, a second diode arranged between the first circuit and a second portion of the first coil winding, and a third diode arranged between a power source and the first circuit.

15. The apparatus of claim 14, wherein the first, second, and third diodes are arranged to keep the induced magnetic force from generating a current on the first coil winding.

16. A method comprising:
driving a first current through a second coil winding of a stator tooth, the first current being discharged from one or more charge storage devices;
driving a second current through a first coil winding of the stator tooth, the second current inducing a third current in the second coil winding, the third current constructively combining with the first current to provide a combined current in the second coil winding,
wherein the combined current induces a magnetic force against one or more rotor teeth to apply a torque.

17. The method of claim 16, wherein driving the first current to the second coil winding comprises opening a first switch or a second switch, or a combination thereof.

18. The method of claim 17, wherein the one or more charge storage devices comprise a pair of charge storage devices, and wherein the opening a the first switch or the second switch, or the combination thereof, maintains a differential voltage across the pair of charge storage devices.

19. The method of claim 18, wherein inducing the magnetic force comprises opening a third switch and the first switch, and closing the second switch.

20. The method of claim 19 further comprising opening the first switch and maintaining a differential voltage across the pair of charge storage devices.

21. The method of claim 20 further comprising closing the third switch and allowing equalization of charge between the pair of charge storage devices.

22. The method of claim 21 further comprising allowing at least one of the pair of charge storage devices to fully discharge.

23. An electric motor comprising:
a rotor comprising a plurality of rotor teeth;
a stator comprising a plurality of stator teeth;
mutually coupled first and second coil windings wound about at least one of the plurality of stator teeth; and
a driver circuit coupled to the mutually coupled first and second coil windings and comprising a plurality of charge storage devices, the driver circuit to:
drive a first current on the first coil winding responsive to which a second current is induced on the second coil winding; and
use electrical resonance between the plurality of charge storage devices and the second coil winding to engender an oscillating magnetic field to interact with one or more of the plurality of rotor teeth, the oscillating magnetic field being based, at least in part, on the generated second current.

24. The electric motor of claim 23, wherein the number of turns of the second coil winding is greater than the number of turns of the first coil winding.

25. The electric motor of claim 24, wherein the number of turns of the second coil winding is at least five times the number of turns of the first coil winding.

26. The electric motor of claim 23, wherein the first current on the first coil winding is in the form of DC current.

27. The electric motor of claim 23, wherein the mutually coupled first and second coil windings are wound about a same stator tooth of the at least one of the plurality of stator teeth.

* * * * *